United States Patent
Chodosh

[11] 3,960,600
[45] June 1, 1976

[54] ANODE CONSTRUCTION
[75] Inventor: Stewart M. Chodosh, Lake Success, N.Y.
[73] Assignee: Leesona Corporation, Warwick, R.I.
[22] Filed: Mar. 9, 1971
[21] Appl. No.: 122,489

Related U.S. Application Data
[63] Continuation-in-part of Ser. No. 627,194, March 30, 1967, abandoned.

[52] U.S. Cl. ............................. 136/120 R; 136/147
[51] Int. Cl.² ........................................... H01M 3/00
[58] Field of Search ............ 136/147, 132, 111, 30, 136/120, 86, 125, 54, 63

[56] References Cited
UNITED STATES PATENTS

| | | | |
|---|---|---|---|
| 1,990,976 | 2/1935 | Booss | 136/147 |
| 2,490,630 | 12/1949 | Jardine | 136/147 |
| 2,610,219 | 9/1952 | Yardney | 136/6 |
| 2,647,157 | 7/1953 | Booth | 136/147 |
| 2,870,235 | 1/1959 | Soltis | 136/111 |
| 3,253,954 | 5/1966 | Banas | 136/54 |

Primary Examiner—Anthony Skapars
Attorney, Agent, or Firm—A. W. Breiner

[57] ABSTRACT

An improved anode primarily for use in a metal/air or metal/oxygen cell is described. The anode comprises a porous metal body wrapped in first and second layers of different and distinct materials, the first layer being hydrophilic and gas-impermeable, when in contact with an aqueous electrolyte such as the cellulosic membranes; and the second layer, preferably in bag form, being gas-permeable, hydrophilic, dimensionally stable, and heat sealable such as co-polymers of vinyl chloride and acrylonitrile. Superior cell performance is obtained.

10 Claims, 3 Drawing Figures

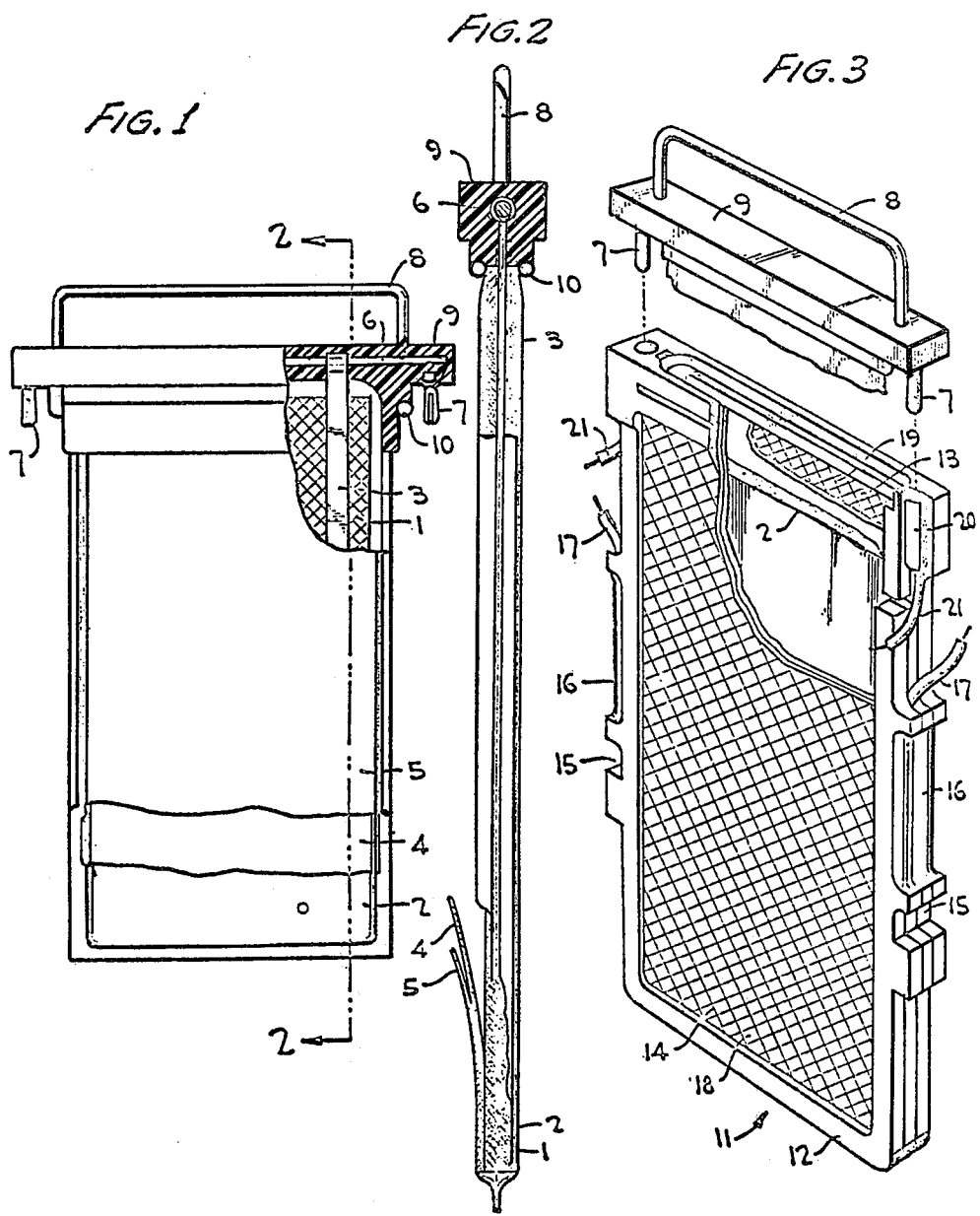

ANODE CONSTRUCTION

This application is a continuation-in-part of co-pending application U.S. Ser. No. 627,194 filed Mar. 30, 1967, now abandoned.

FIELD OF THE INVENTION AND PRIOR ART

This invention is directed to electrochemical devices for generating electrical energy. More particularly, the invention is directed to an improved construction of porous metal anodes primarily for use in metal/air batteries.

Air or oxygen depolarized cells which have a high charge and discharge rate and which have high energy to density and high energy to volume ratios have been described in commonly assigned Oswin co-pending application U.S. Ser. No. 533,516 filed March 11, 1966. The ability to obtain the aforesaid features in the cells is primarily a result of the novel and highly efficient cathodes employed. These cathodes comprise a continuous hydrophobic polymer film which is coated on one surface with a layer of catalytic metal. In operation, the uncoated surface of the membrane is in contact with air or oxygen and the coated surface is in contact with the electrolyte of the cell which separates the cathode from the anode. The aforesaid cathodes have been employed with substantially conventional metal anodes which comprise substantially solid plates, or porous bodies which may or may not contain a metal current collecting grid.

As a result of the high discharge rate and depth of discharge of the anode, migration of the reactant species often occurs. In view of the compact structure of the cells utilizing a very minute space between the anode and cathode for retaining the electrolyte, even minor amounts of migration can detrimentally affect the cell performance. To prevent the migration of reactant species, a layer of hydrophilic material has been wrapped around the anode and utilized to retain the electrolyte of the cell. Although such cells are highly satisfactory for many operations, a more stable anode and one more resistant to handling is desirable.

OBJECTS AND BRIEF DESCRIPTION OF THE INVENTION

Accordingly, it is a primary object of the present invention to provide an improved metal anode.

It is another object of this invention to provide an improved porous metal anode permitting rapid discharge and recharge in a metal/air cell.

It is another object of this invention to provide an improved porous metal anode which can be rapidly discharged and recharged with substantially no migration of reactant species.

It is still another object of this invention to provide an improved replaceable porous metal anode for a metal/air battery capable of retaining sufficient liquid electrolyte impregnated therein to satisfy the requirements of the cell.

It is still another object of this invention to provide a porous metal anode comprising a porous metal body wrapped in first and second layers of different and distinct materials, the first layer being hydrophilic but impermeable to gases and particulate reaction species of the metal body when in contact with an aqueous electrolyte; and the second layer being gas-permeable, hydrophilic, dimensionally stable, and heat sealable.

It is still another object of this invention to provide an improved anode comprising a porous zinc body wrapped in a first layer of unglycerinated desulfurized fibrous cellulose and contained in a bag composed of a co-polymer of vinylchloride and acrylonitrile.

It is still another object of this invention to provide a method of manufacturing a porous metal anode comprising fabricating metal particles into a porous metal body, wrapping said metal body in a first layer of material which is hydrophilic but impermeable to gases and particulate reaction species of the metal body when in contact with an aqueous electrolyte; and thereafter enclosing the wrapped metal body in a bag which is gas-permeable when in contact with an aqueous electrolyte, hydrophilic, dimensionally stable, and heat sealable; and encapsulating a plastic top on the anode sealing the bag.

These and other objects of the invention will become more readily apparent from the following detailed description, with particular emphasis being placed upon the drawing.

The aforesaid objects of the present invention are accomplished by fabricating a porous metal body using conventional procedures. For example, select metal particles can be compressed in a conventional manner under suitable conditions of elevated temperature and pressure to form an anode having the desired shape. The temperature and pressure employed are not particularly critical provided complete sintering and coalescence of the particles does not occur. Temperatures at approximately the sintering temperature of the metal at the pressures employed are preferred. Alternatively, the metal particles can be dry mixed with a powdered resinous binder such as polytetrafluoroethylene. The admixture of metal particles and binder is compressed in a conventional manner, again under suitable conditions of elevated temperature and pressure to form an anode having the desired shape. The temperature depends upon the resin selected and the pressure applied which is normally at from about 250 to 25,000 pounds per square inch. As a further alternative procedure, metal oxides can be placed in a suitable mold and the oxides reduced electrolytically to the anodic metal, and thereafter compressed to the desired thickness and shape. After the metal body is formed, it is wrapped in a hydrophilic material which is impermeable to gases and the particulate reactation species of the anode when in contact with an aqueous electrolyte. Accordingly, this hydrophilic wrap will support the porous metal anode and will permit the passage of ions from the electrolyte to the anode, but will not permit gas passage to the anode or migration of the particulate reaction species. A second wrap in bag form is placed around the anode which is gas-permeable when in contact with an aqueous electrolyte, hydrophilic, dimensionally stable, and heat sealable. This material will retain aqueous electrolyte for operating the cell and improve the mechanical integrity and the performance of the anode. The anode can be rapdily discharged and recharged without detrimental change in shape, or the like. This feature is of critical importance in metal/air cells where the cells are mechanically recharged by removing the discharged anodes and inserting fresh anodes. The removed anodes can be externally recharged or discarded. When using the replaceable anodes, it is critical that oxygen does not reach the anode while the anode is being inserted in the cell or when the anode is taken out, since oxygen will cause an anode such as porous zinc to ignite and burn up. Furthermore, it is necessary that the outermost wrap permit convenient insertion and removal of the anode in the cell. Accordingly, the wrap around the anode must be smooth and capable of being sealed at the top. Cells utilizing replaceable anodes are described in commonly assigned co-pending Oswin and Chodosh U.S. application Ser. No. 517,603 filed Dec. 30, 1965; and the external recharging of the anodes in Chodosh U.S. Application Ser. No. 517,594 filed Dec. 30, 1965.

The metal powder used in making the anode described herein can be any conventional electro-conductor employed as the anode material in an electrochemical cell. In the preferred embodiment where the improved anode is employed in a metal/air cell, it is essential that the metal selected be electrochemically reactive with a compatible electrolyte and be more electropositive than oxygen. Such materials include lead, zinc, iron, cadmium, aluminum, and magnesium. From the standpoint of cost, capacity, and convenience, zinc is a preferred material. As will be apparent, in selecting the anode material an important consideration is assurance that the material is compatible with the electrolyte of the cell. The particle size of the metal is not critical. Preferably, however, the metal selected will have a particle size of from about 0.5 to 40 mils in diameter. In the event a plastic binder is utilized, it should have a particle size of about the same magnitude as the metal particles or smaller. Normally, the binder which includes such materials as polytetrafluoroethylene, polyethylene, polyvinylchloride, polypropylene, co-polymers of vinyl chloride and acrylonitrile, vinylacetate, and the like, will comprise from about 0.5 to 18 percent by weight of the total admixture.

The first hydrophilic material wrapped around the metal anode body, while being hydrophilic, must preclude the passage of gases and particulate reaction species of the anode body when in contact with an aqueous electrolyte. Such materials include the membranes of a cellulosic material such as cellophane, unglycerinated desulfurized fibrous cellulose, and the like. The second material employed which preferably is in bag form must be hydrophilic, dimensionally stable and heat sealable. This latter wrap functions to retain the metal body and first wrap intact and as a matrix for the cell electrolyte. Accordingly, the two layers having separate and distinct characteristics are complementary of each other. The second wrap can be a fibrous synthetic material such as a co-polymer of vinylchloride and acrylonitrile sold by the Union Carbide Corporation under the tradename "Dynel," polyamide polymers, co-polymers of polyvinylalcohol and polyvinylchloride, polyacrylate esters, and the like. The thickness of the wrap is not particularly critical, but should be as thin as possible in order to improve the energy to density ratio and energy to volume ratio as well as to minimize the internal resistance of the cells. The membranes preferably are from about 0.5 to 10 mils in thickness.

As a result of cost, complementary characteristics, and the like, the preferred anodic metal is zinc. The first wrap material is unglycerinated desulfurized fibrous cellulose, and the second wrap is a co-polymer of vinylchloride and acrylonitrile. The first layer is gas-impermeable and effectively retains the reaction species of the anode localized at the anode when in contact with an aqueous electrolyte minimizing problems of migration. The second layer effectively retains the metal body and first layer intact and functions as an electrolyte matrix or the like. Furthermore, the material is dimensionally stable and heat sealable. When the anode prepared as described is employed in an air depolarized cell, greatly enhanced performance from the standpoint of rapid discharge and recharge, structural integrity, and the like is realized.

The improvement in the anode construction in accordance with the present invention will be more readily apparent by reference to the drawing wherein like numerals are employed throughout to designate like parts.

THE DRAWING

In the drawing,

FIG. 1 is a front view partially in section of an anode;

FIG. 2 is a cross-sectional view taken along line 2—2 of FIG. 1; and

FIG. 3 is a partially exploded view of an air depolarized cell utilizing an anode as shown in FIGS. 1 and 2.

More specifically, referring primarily to FIGS. 1 and 2, a metal grid current collector 1 which conveniently is a metal screen is utilized as the center or support for a metal body 2. Current collector tabs 3, which preferably are silver strips approximately ⅛ by 0.010 inches thick are placed on the metal screen so that they extend beyond the metal screen. The metal body is made by mixing zinc oxide and mercury oxide at a weight ratio of 98 percent zinc to 2 percent mercury based on the metal. A separator material such as a co-polymer of vinyl chloride and acrylonitrile is placed in a mold. The admixture of zinc oxide and mercury oxide is placed on the paper in the mold and leveled to approximately one-half the thickness of the desired anode. A conductive silver screen 2 and silver current collecting tabs 3 are placed over the mixture and, thereafter, the remainder of the admixture of zinc oxide and mercury oxide added. The metal oxide powders are lightly compacted and the separator paper sealed. The structure is placed in a tank of 5 percent aqueous potassium hydroxide and electrolytically reduced at a current density of 0.19 amps per square inch over a period of approximately 8 hours. After the reduction, the anode is washed to remove excess potassium hydroxide and the structure pressed to the thickness desired and dried to give a porous structure. Thereafter, a layer of desulfurized fibrous cellulose 4, 0.003 inches in thickness, was wrapped around the porous body. A bag 5 composed of a co-polymer of vinylchloride and acrylonitrile having a membrane thickness of 0.004 inches was employed to enclose the wrapped porous metal body. The silver current collector tabs 3 which are on either end of the anode were placed in contact with a buss bar 6 which was in contact with plugs 7. A handle 8 was attached to the buss bar. Thereafter, a plastic anode top 9 was encapsulated over the buss bar around the base of terminal 7, sealing the buss bar 6, handle 8, and the top part of bag 5 in position. An O-ring composed of buna-N rubber 10 circumscribes an indentation in the plastic anode top. The base of the anode is 2.5 inches wide and 0.12 inch thick. The top of the anode, i.e., the plastic anode top, is 3.2 inches wide and 0.32 inch thick. The anode has a height of 6.5 inches.

FIG. 3 illustrates a metal/air cell utilizing an anode of the type shown in FIGS. 1 and 2. The cell module comprises an envelope cathode 11 made up of a bi-cell frame 12 and reactive cathodes 13 and 14. The frame shown contains cell guide supports 15 which are to facilitate the positioning of the cell module in a battery casing and moldings 16 which house positive leads 17 which are in electrical contact with the cathode. In the embodiment shown, the cathode is made up of a continuous hydrophobic membrane 18, a conductive support screen 19, and an electrocatalyst layer pressed into and around the support screen. The hydrophobic membrane is polytetrafluoroethylene and the electrocatalyst is a uniform admixture of platinum and polytetrafluoroethylene particles. The catalyst and bonding agent are present at a weight ratio of 10 parts to 3 parts. The anode fits into the envelope cathode and is locked into position by negative terminals 7 which fit into negative terminal jacks 20 of the envelope cathode. The terminals are in electrical contact with the anode body by silver current collecting tab 3 as noted hereinbefore. The handle 8 is employed to facilitate removal of the anode. Negative leads 21 emerge from the jack terminal at each side of the cell. Also as noted hereinbefore, the electrolyte of the cell is retained in the wrappings of the anode. A plurality of the aforesaid cells, when in series or parallel connection, can be utilized as the power source for various units including radio receiving and transmitting sets or the like.

In the aforesaid embodiment, the zinc oxide and mercury oxide particles can be replaced by other metal oxide particles which are compatible with the electrolyte of the cell and which are more electropositive than oxygen. Thus, the zinc oxide powder can be replaced with oxides of lead, iron, cadmium, aluminum, and magnesium powders. Furthermore, the metal particles themselves, or the metal particles in admixture with a resinous binder, can be employed. Moreover, the unglycerinated desulfurized fibrous cellulose membrane can be replaced with other cellulosic membranes, and the second wrapping can be replaced with fibrous polyamide membranes, co-polymers of vinylchloride and polyvinylalcohol, and the like. It should be appreciated that the instant invention is not to be construed as being limited by the illustrative embodiment. It is possible to produce still other embodiments without departing from the inventive concept herein disclosed. Such embodiments are within the ability of one skilled in the art.

It is claimed:

1. An anode for an electrochemical cell comprising a porous anodic metal body wrapped in first and second layers of different and distinct materials, said first layer being gas-impermeable when in contact with an aqueous electrolyte, hydrophilic, and ion-permeable; and said second layer being gas-permeable when in contact with an aqueous electrolyte, hydrophilic, dimensionally stable, and heat sealable.

2. The anode of claim 1 wherein the second layer is in bag form and heat sealed at the top.

3. The anode of claim 2 wherein the metal body includes a metal selected from the group consisting of lead, zinc, iron, cadmium, aluminum, and magnesium.

4. The anode of claim 2 wherein the anodic metal body includes zinc.

5. The anode of claim 1 wherein the anodic metal body includes zinc, the first layer is composed of unglycerinated desulfurized fibrous cellulose and the second layer is in bag form and is composed of a co-polymer of vinylchloride and acrylonitrile.

6. An anode comprising a porous anodic metal body wrapped in first and second layers of different and distinct materials, said first layer being gas-impermeable when in contact with an aqueous electrolyte, hydrophilic, and ion-permeable; and said second layer being gas-permeable when in contact with an aqueous electrolyte, hydrophilic, dimensionally stable, and heat sealable, disposed in a metal/air cell comprising an anode, a cathode, and an electrolyte between said anode and cathode, said cathode comprising a hydrophobic membrane in contact with a catalyst layer.

7. The structure of claim 6 wherein the second layer is in bag form and heat sealed at the top.

8. The structure of claim 7 wherein the anodic metal body includes a member of the group consisting of lead, zinc, iron, cadmium, aluminum, and magnesium.

9. The structure of claim 7 wherein the anodic metal body includes zinc.

10. The structure of claim 6 wherein the anodic metal body includes zinc, the first layer is unglycerinated desulfurized fibrous cellulose, and the second layer is in bag form and is a co-polymer of vinylchloride and acrylonitrile.

* * * * *